Dec. 16, 1930.  H. A. THOMPSON  1,784,851
RAILWAY TRAFFIC CONTROLLING APPARATUS
Filed Nov. 5, 1927  9 Sheets-Sheet 1

INVENTOR:
H. A. Thompson,
by
his attorney

Dec. 16, 1930.  H. A. THOMPSON  1,784,851
RAILWAY TRAFFIC CONTROLLING APPARATUS
Filed Nov. 5, 1927  9 Sheets-Sheet 2

INVENTOR:
H. A. Thompson
by A. L. Vennall
His Attorney

Dec. 16, 1930.   H. A. THOMPSON   1,784,851
RAILWAY TRAFFIC CONTROLLING APPARATUS
Filed Nov. 5, 1927   9 Sheets-Sheet 3

INVENTOR:
H. A. Thompson
by A. R. Vencill
His Attorney

Dec. 16, 1930.   H. A. THOMPSON   1,784,851
RAILWAY TRAFFIC CONTROLLING APPARATUS
Filed Nov. 5, 1927   9 Sheets-Sheet 4

INVENTOR:
H. A. Thompson
by his Attorney

Dec. 16, 1930.  H. A. THOMPSON  1,784,851
RAILWAY TRAFFIC CONTROLLING APPARATUS
Filed Nov. 5, 1927   9 Sheets-Sheet 5

INVENTOR:
H. A. Thompson
by A. L. Vencill
His Attorney

Patented Dec. 16, 1930

1,784,851

UNITED STATES PATENT OFFICE

HOWARD A. THOMPSON, OF EDGEWOOD, PENNSYLVANIA, ASSIGNOR TO THE UNION SWITCH & SIGNAL COMPANY, OF SWISSVALE, PENNSYLVANIA, A CORPORATION OF PENNSYLVANIA

RAILWAY-TRAFFIC-CONTROLLING APPARATUS

Application filed November 5, 1927. Serial No. 231,277.

My invention relates to railway traffic controlling apparatus, and particularly to apparatus for controlling highway crossing signals, that is, signals which are placed adjacent intersections of highways and railways for the purpose of warning users of the highway when a train is approaching the intersection.

I will describe several forms of apparatus embodying my invention and will then point out the novel features thereof in claims.

Figure 1:
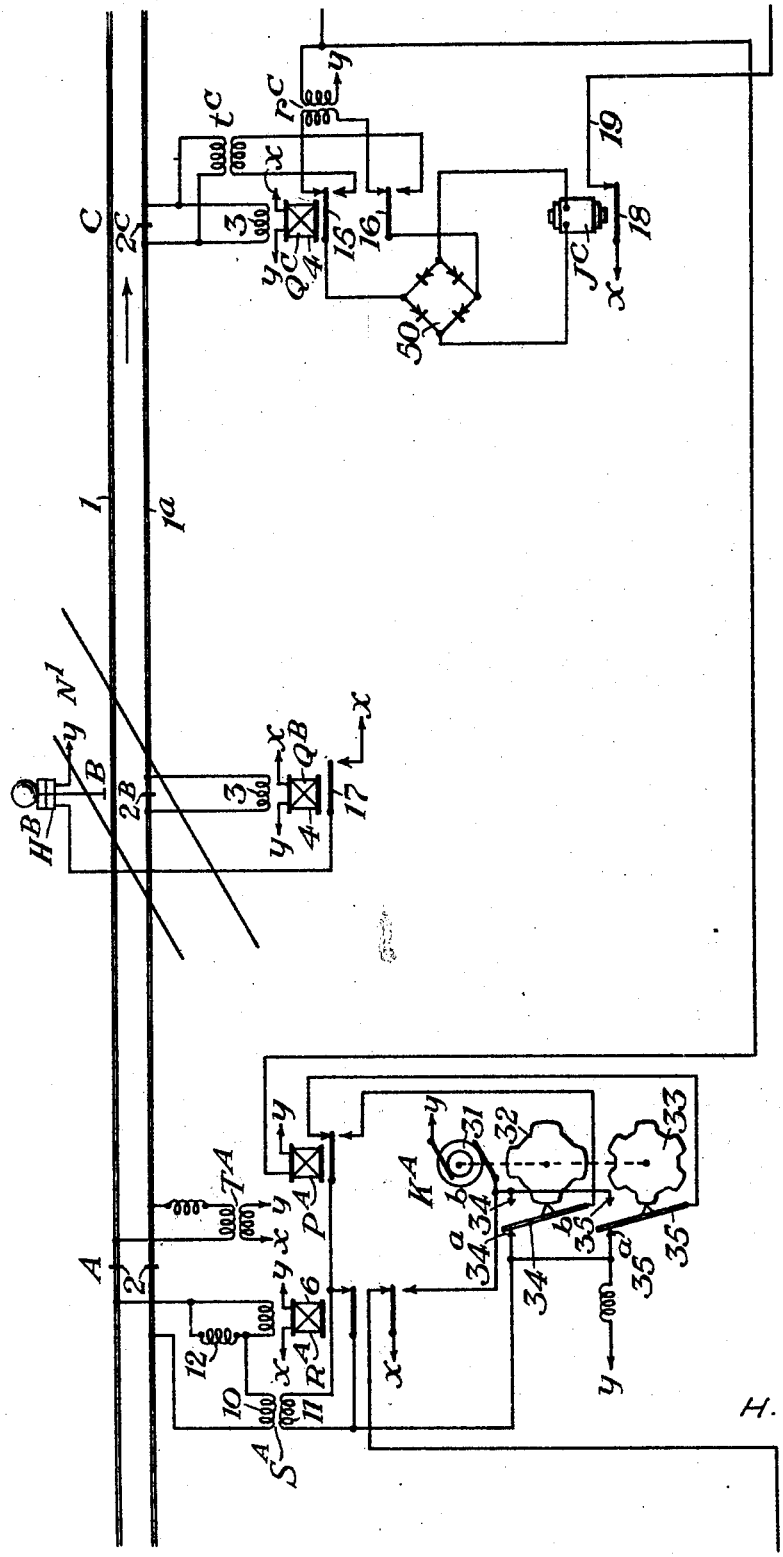
Figure 2:
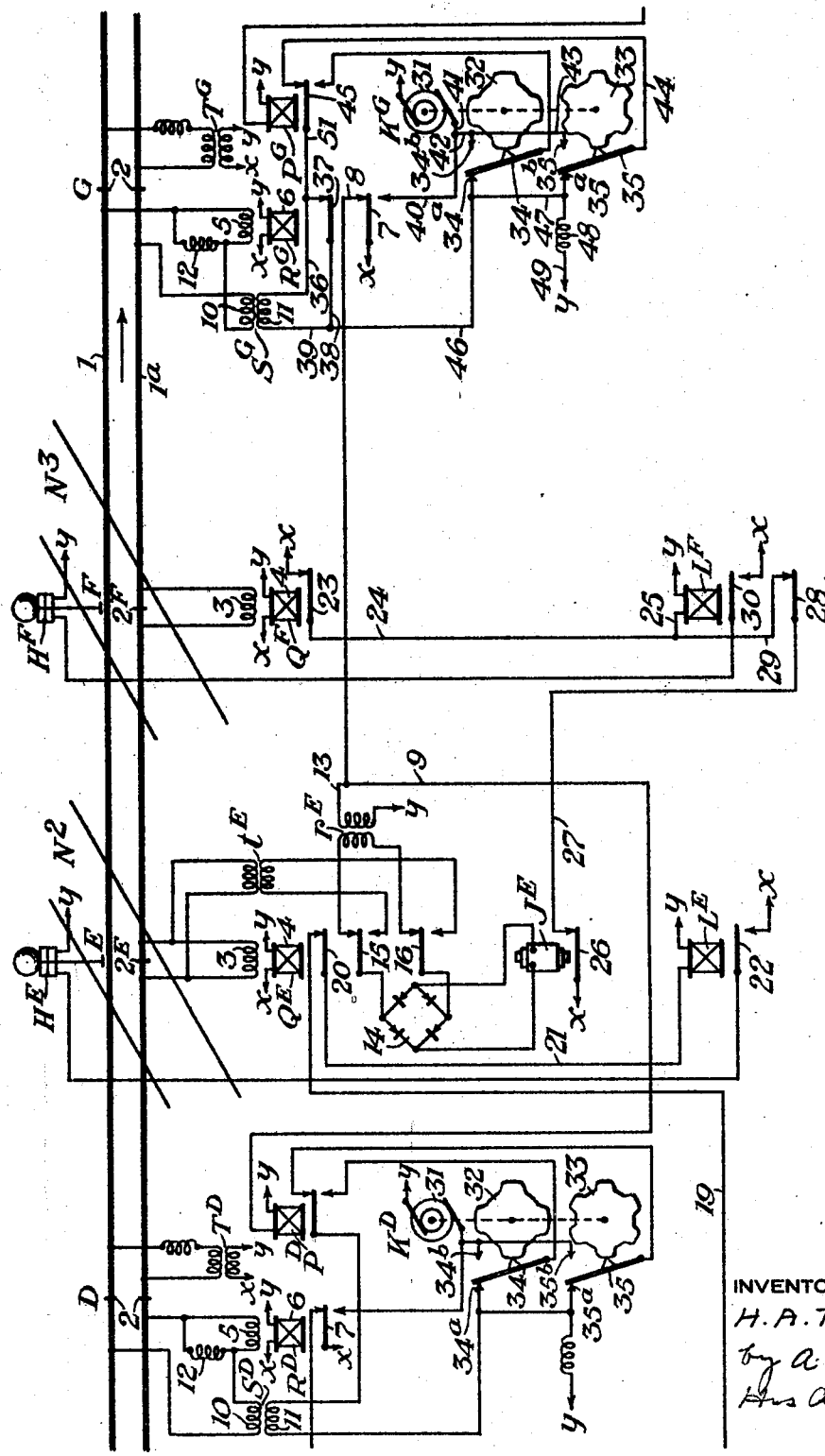

In the accompanying drawings, Figs. 1 and 2 when placed end to end with Fig. 1 on the left, constitute a view showing one form of railway traffic controlling apparatus embodying my invention. Figs. 3–9, inclusive, are views showing a number of modifications of the apparatus illustrated in Fig. 2.

Similar reference characters refer to similar parts in each of the several views.

Referring first to Figs. 1 and 2, the reference characters 1 and $1^a$ designate the track rails of a stretch of railway track over which traffic normally moves in the direction indicated by the arrows. These rails are divided, by means of insulated joints 2, into a plurality of successive track sections A—D, D—G, etc. Track circuit current is supplied to the rails of each section from a track transformer designated by the reference character T with a suitable exponent and having its secondary connected across the rails adjacent the entrance end of the corresponding section. The primary of each track transformer T is constantly supplied with alternating current from terminals $x$ and $y$ of a suitable source of energy not shown in the drawing. Each track section is also provided with a track relay designated by the reference character R with a suitable exponent and comprising two windings 5 and 6, one of which, 5, is constantly connected across the rails adjacent the exit end of the corresponding section. The other winding 6 of each track relay is constantly supplied with alternating current from terminals $x$ and $y$ so that when track circuit current is supplied to winding 5 of the relay from the rails of the corresponding section, the track relay becomes energized.

Each track section is further provided with a repeater relay designated by the reference character P with an appropriate exponent and located adjacent the entrance end of the section. Referring particularly to repeater relay $P^D$, this relay is provided with a circuit which may be traced from terminal $x$, through front contact 7 of track relay $R^G$, wires 8 and 9, and winding of relay $P^D$ to terminal $y$. Relay $P^D$ is therefore energized only when track relay $R^G$ is energized. Relay $P^A$ is controlled by track relay $R^D$ in the same manner as just described for the control of relay $P^D$ by relay $R^G$.

The reference character $N^1$ designates a highway intersecting the stretch of track shown in the drawing at the point B in the section A—D. A highway crossing signal $H^B$ is located adjacent point B for the control of traffic along the highway $N^1$. In similar manner two highways $N^2$ and $N^3$ intersecting the section D—G at points E and F, respectively, and highway crossing signals $H^E$ and $H^F$ are located at these points for the control of traffic along highways $N^2$ and $N^3$, respectively. An insulated joint $2^B$ is located in rail $1^a$ of section A—D adjacent point B, and one winding 3 of a relay $Q^B$ is connected across this joint in series with the track circuit of section A—D. A second winding 4 of relay $Q^B$ is constantly supplied with alternating current from terminals $x$ and $y$ in such manner that the relay is normally energized by the track circuit current which flows through winding 3 of the relay when the section A—D is unoccupied. In similar manner, winding 3 of relay $Q^C$ is connected across a second insulated joint $2^C$ in rail $1^a$ of section A—D and windings 3 of relays $Q^E$ and $Q^F$ are connected across insulated joints $2^E$ and $2^F$ in rail $1^a$ of section D—G adjacent points E and F, respectively. The remaining winding 4 of each of the relays $Q^C$, $Q^E$ and $Q^F$ is constantly supplied with alternating current from terminals $x$ and $y$ in such manner that the relays Q are all normally energized by the track circuit current supplied to the associated section. The crossing signal $H^B$ is controlled directly by relay $Q^B$ so that when this relay is de-energized current is supplied from terminals $x$ and $y$ to the operating mechanism of the signal over back contact 17 of relay $Q^B$. The signal $H^B$ is therefore operated whenever relay $Q^B$ is de-energized.

Signal $H^E$ is controlled by a relay $L^E$ so that when this relay is de-energized to close its back contact 22, signal $H^E$ is operated. Furthermore, a relay $L^F$ controls signal $H^F$ so that when back contact 30 of relay $L^F$ is closed, relay $H^F$ is operated. Relay $L^E$ is controlled by relay $Q^E$ and by a relay $J^C$ which is in turn controlled by relay $Q^C$. The reference character $r^C$ designates a transformer having its primary connected in parallel with relay $P^A$ so that this transformer is supplied with current when relay $R^D$ is energized. When relay $Q^C$ is energized, the secondary of transformer $r^C$ is connected over front contacts 15 and 16 of relay $Q^C$ with the winding of relay $J^C$ through a rectifier 50, and relay $J^C$ is therefore energized. When relay $Q^C$ is de-energized, the winding of relay $J^C$ is connected through rectifier 50 and back contacts 15 and 16 with the secondary of a transformer $t^C$, which has its primary constantly connected in parallel with winding 3 of relay $Q^C$. When relay $Q^C$ is de-energized, therefore, relay $J^C$ is energized only if an alternating difference of potential is supplied across the insulated joint $2^C$; and when relay $Q^C$ is energized, relay $J^C$ is energized only if relay $R^D$ is also energized. When relay $J^C$ is energized and when relay $Q^E$ is also energized, current flows from terminal $x$, over front contact 18 of relay $J^C$, wire 19, front contact 20 of relay $Q^E$, wire 21, and winding of relay $L^E$ to terminal $y$, thereby energizing relay $L^E$ and holding its back contact 22 open to prevent operation of the signal $H^E$.

The control of relay $J^E$ by relay $Q^E$ and by transformers $t^E$ and $r^E$ is similar to the control of relay $J^C$ by relay $Q^C$ and transformers $r^C$ and $t^C$ and will be apparent without further explanation. Relay $L^F$ is provided with a pick-up circuit which may be traced from terminal $x$, through front contact 23 of relay $Q^F$, wires 24 and 25 and winding of relay $L^F$ to terminal $y$. Relay $L^F$ is also provided with a stick circuit which may be traced from terminal $x$, through front contact 26 of relay $J^E$, wire 27, front contact 28 of relay $L^F$, wires 29 and 25, and winding of relay $L^F$ to terminal $y$. Relay $L^F$, therefore, becomes energized whenever relay $Q^F$ becomes energized, and is subsequently maintained in its energized condition as long as relay $J^E$ remains energized.

The apparatus herein shown and described is intended for co-operation with train carried governing means responsive to train controlling current supplied to the trackway from a point in advance of the train. For the purpose of supplying this train controlling current to the trackway, each track section is provided with a coding device designated in general by the reference character K with a suitable distinguishing exponent and each comprising a motor 31 and two code wheels 32 and 33 operated thereby and each provided at its periphery with a plurality of teeth. The code wheel 32 co-operates with a movable contact 34 to move the contact alternately into engagement with two fixed contacts $34^a$ and $34^b$ when the code wheel is rotated. In similar manner when code wheel 33 is rotated a movable contact member 35 is moved alternately into engagement with two fixed contacts $35^a$ and $35^b$. It will be observed from the drawing that the code wheels 32 and 33 have different numbers of teeth so that when the device K is operated the contact members 34 and 35 are actuated at different frequencies.

Train controlling current is supplied to section D—G by the coding device $K^G$ through a train control transformer designated in the drawing by the reference character $S^G$ and having a secondary 10 connected across the rails in series with the winding 5 of track relay $R^G$. Under normal conditions, that is, when relay $R^G$ is energized, the primary 11 of transformer $S^G$ is short-circuited, through a path of low resistance which may be traced from the right-hand terminal of primary 11, through wire 36, front contact 37 of relay $R^G$, and wires 38 and 39 back to the left-hand terminal of primary 11. Under these conditions the impedance of secondary 10 is comparatively small and does not interfere with the proper operation of relay $R^G$ by track circuit current supplied thereto from transformer $T^D$ at the opposite end of the section. When relay $R^G$ is de-energized, however, the path of low resistance just traced for primary 11 of transformer $S^G$ is interrupted. A circuit is now closed for motor 31 of the coding device $K^G$ from terminal X, over back contact 7 of relay $R^G$, wires 40 and 41 and motor 31 of coding device $K^G$ to terminal $y$. The motor 31 of the coding device $K^G$ is therefore operated to actuate the contact members 34 and 35 as explained hereinbefore. Assuming that relay $P^G$ is energized, each time contact 35 is moved to the right, current flows from terminal $x$, through back contact 7 of relay $R^G$, wires 40, 42 and 43, contact 35—$35^b$, wire 44, front contact 45 of relay $P^G$, wires 51 and 36, primary 11 of transformer $S^G$, wires 39, 46 and 47, impedance 48, and wire 49 to terminal $y$. Train controlling current is supplied, under these conditions, to the rails of section D—G in series with winding 5 of track relay $R^G$. It should be observed, however, that the train controlling current supplied to section D—G is of the opposite polarity from the track circuit current normally supplied to this section, that is to say, the relative instantaneous direction of the train controlling current flowing through winding 5 of relay $R^G$ is now reversed, so that relay $R^G$ is not picked up but the armatures of this relay are forced down against their back contacts. In similar manner, if section D—G is occupied by a train located between points D and E, so that the train controlling current supplied by transformer $S^G$ flows through windings 3 of relays $Q^E$ and $Q^F$, these relays will also be held in their de-energized positions due to the polarity of the train controlling current.

Returning now to the operation of the coding device $K^G$, when contact 35 next moves to the left, the circuit traced for supplying energy to primary 11 of transformer $S^G$ is interrupted and a path of low resistance is closed for this primary from the right-hand terminal of the primary, through wires 36 and 51, front contact 45 of relay $P^G$, wire 44, contact 35—35$^a$, and wires 47, 46 and 39, back to primary 11 of transformer $S^G$. During the interval of time that the circuit just traced is closed, the primary 11 of transformer $S^G$ is short-circuited so that the impedance of secondary 10 of this transformer is comparatively small. If, under these conditions, the section D—G is unoccupied, so that current from transformer $T^D$ may reach the winding of relay $R^G$, this relay will become energized. The reference character 12 designates a reactor which is connected directly across winding 5 of relay $R^G$ and which has the characteristic of increasing its impedance in response to decreases in the electromotive force applied thereto. For example, this device may be a "leakage reactor" of the usual and well known construction. With this arrangement the impedance of the reactor 12 has the effect of shunting current away from winding 5 of relay G which effect is comparatively small for the low values of electromotive force applied to the reactor by transformer $T^D$; but when train controlling current is being supplied the rails by transformer $S^G$, a comparatively high electromotive force is applied across the terminals of reactor 12 and its impedance is then correspondingly low, thereby increasing its tendency to shunt current away from winding 5 or relay $R^G$. As a result a relatively small proportion of train controlling currents flows through winding 5 of relay $R^G$.

When relay $P^G$ is de-energized, the circuits for transformer $S^G$ are similar to those just traced, except that contact 34—34$^b$ is substituted for contact 35—35$^b$ and contact 34—34$^a$ is substituted for contact 35—35$^a$. It follows that when relay $R^G$ is de-energized, train controlling current is supplied to the rails of section D—G and this train controlling current is periodically interrupted at a comparatively high frequency if relay $P^G$ is energized and at a comparatively low frequency if this relay is de-energized. The train carried governing means may be selectively responsive to the frequencies of the periodic interruptions in the train controlling current in any suitable manner.

As shown in the drawing the stretch of track is unoccupied so that all of the track relays R and all of the relays Q are energized. Relays P are also energized. As a result, the coding devices K are all at rest and no train controlling current is supplied to the rails. Relays $J^C$, $J^E$, $L^E$ and $L^F$ are also energized and the circuits for all of the highway signals $H^B$, $H^E$ and $H^F$ are open.

In explaining the operation of the apparatus, I will assume that a train moving in the direction of the arrow traverses the stretch of track shown in the drawing. When this train enters section A—D, the shunting effect of its wheels and axles decreases the track circuit current flowing through the track circuit of the section. Relays $Q^B$, $Q^C$ and $R^D$ therefore become de-energized. The closing of back contact 17 of relay $Q^B$ completes the circuit for signal $H^B$ which thereupon commences to operate. The closing of back contact 7 of relay $R^D$ sets motor 31 of coding device $K^D$ into operation and, assuming that relay $P^D$ is energized, train controlling current is intermittently supplied to transformer $S^D$ over contact 35 operated by code wheel 33. Relay $Q^C$ is now de-energized so that relay $J^C$ is connected through rectifier 50 with transformer $t^C$. Each impulse of train controlling current supplied to the rails causes a corresponding impulse of energy to be supplied through transformer $t^C$ and rectifier 50 to relay $J^C$. Due to the slow acting characteristics of this relay, it holds its front contacts closed during the time interval between successive impulses of the train controlling current and during the transfer of energy from transformer $r^C$ to $t^C$. Front contact 18 of relay $J^C$ therefore remains closed and relay $L^E$ is held in its energized position to prevent operation of the signal $H^E$. When the train has completely passed point B, track circuit current from transformer $T^A$ flows from rail 1, through the wheels and axles of the train to rail 1$^a$ on the right of insulated joint 2$^B$ and return through winding 3 of relay $Q^B$ and rail 1 to transformer $T^A$. The current then supplied to relay $Q^B$ is of the proper polarity to energize this relay and it therefore opens its back contact 17, and interrupts the operation of signal $H^B$. In similar manner, when the train has passed point C, current from transformer $T^A$ picks up relay $Q^C$, thereby connecting relay $J^C$ with transformer $r^C$. But the primary circuit of this transformer is now open at back contact 7 of relay $R^D$ so that relay $J^C$ becomes de-energized. The opening of front contact 18 of this relay interrupts the circuit for relay $L^E$ and the latter relay opens to set signal $H^E$ into operation. When the train enters section D—G, relays $Q^E$, $Q^F$ and $R^G$ become de-energized, and relay $P^D$ also becomes de-energized. Train controlling current is now being supplied to the rails of section D—G through transformer $S^G$, but for the reasons already explained, this train controlling current does not energize relays $Q^E$, $Q^F$ and $R^G$. Relay $J^E$ now receives train controlling current from transformer $t^E$, and this relay therefore remains closed.

When the train moves out of section A—D, current from transformer $T^A$ may flow through winding 5 of relay $R^D$ and during the first interval that primary 11 of transformer $S^D$ is short-circuited to reduce the impedance of secondary 10 of this transformer the track circuit current picks up relay $R^D$, thereby de-energizing the coding device $K^D$ and discontinuing the supply of train controlling current from the rails of section A—D. When front contact 7 of relay $R^D$ closes, current is supplied to relay $P^A$ and to the primary of transformer $r^C$, and since relay $J^C$ is connected with this transformer relay $J^C$ now becomes energized. The closing of contact 18 of relay $J^C$ does not energize relay $L^E$, however, because the circuit for relay $L^E$ is now open at front contact 20 of relay $Q^E$, and the signal $H^E$ continues to operate. When the train passes point E, train controlling current from transformer $T^D$ flows through winding 3 of relay $Q^E$ and picks up this relay. This operation completes the circuit for relay $L^E$ and opens back contact 22 thereon to discontinue the operation of signal $H^E$. Relay $J^E$ is now connected with the secondary of transformer $r^E$, but the primary circuit for this transformer is open at front contact 7 of relay $R^G$ and relay $J^E$ becomes de-energized. The pick-up circuit for relay $L^F$ was opened at front contact 23 of relay $Q^F$ when the train first entered section D—G and the opening of front contact 26 of relay $J^E$ breaks the stick circuit for relay $L^F$, which thereupon closes its back contact 30 and sets signal $H^F$ into operation. When the train passes point F, relay $Q^F$ becomes energized, thereby closing the pick-up circuit for relay $L^F$, and breaking the operating circuit for signal $H^F$ at back contact 30 of relay $L^F$. When the train passes out of section D—G, relay $R^G$ becomes energized, thereby interrupting the supply of train controlling current to the rails of section D—G and supplying energy to relay $P^D$ and to transformer $r^E$. Relay $J^E$ therefore becomes energized to complete the stick circuit for relay $L^F$ and to restore the apparatus to its normal condition.

Figure 3:
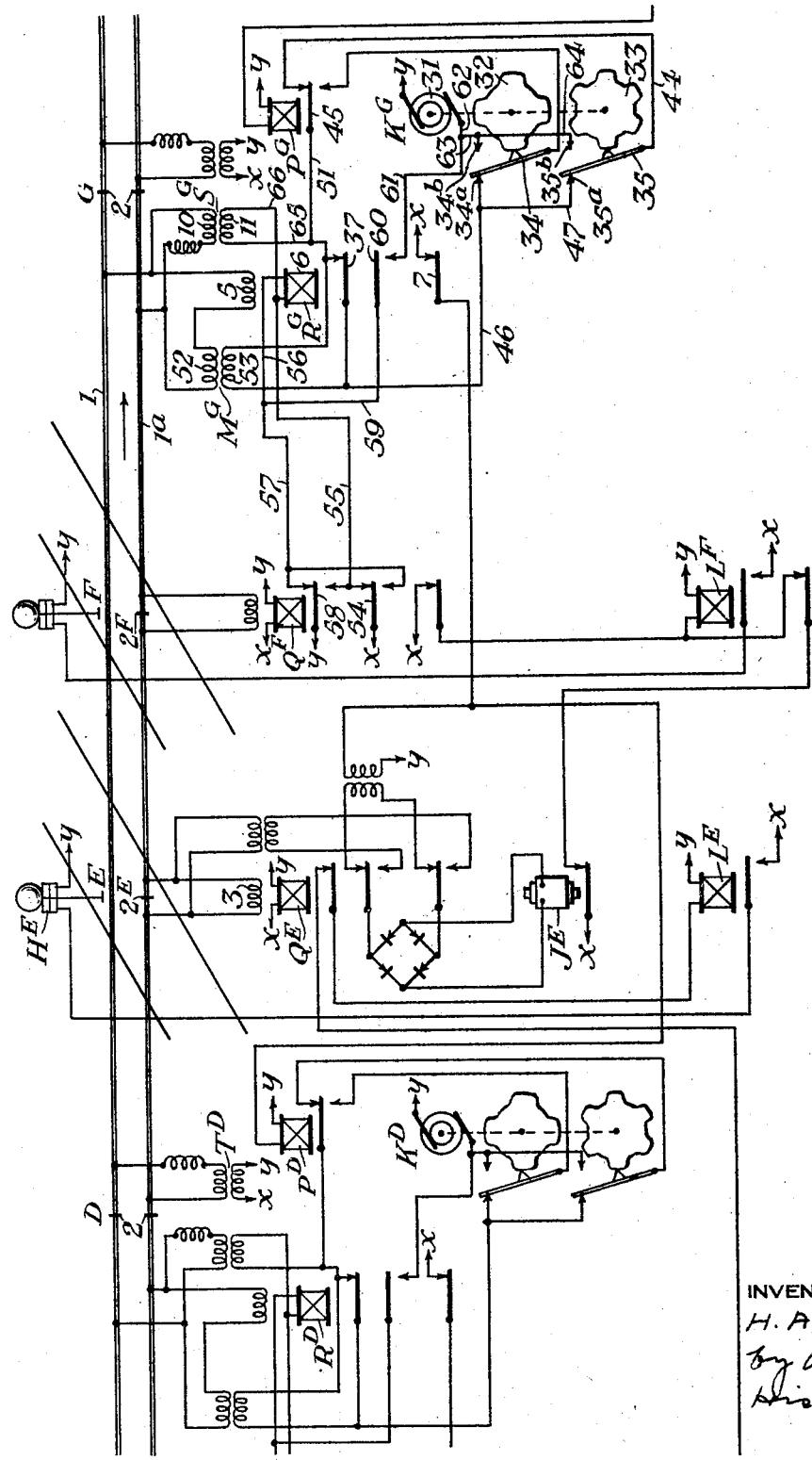

Referring now to Fig. 3, the apparatus is similar to that shown in Fig. 2, but one winding 52 of a transformer $M^G$ is connected in series with winding 5 of relay $R^G$, and the secondary 10 of the train control transformer $S^G$ is connected in parallel with winding 5 and winding 52 in series. With this arrangement it will be apparent that if the polarity of the train controlling current is such as to hold the relays $Q^E$ and $Q^F$ in their de-energized position with the train between points D and E, the train controlling current will flow through winding 5 of relay $R^G$ in the same instantaneous direction as does the track circuit current from transformer $T^D$ when section D—G is unoccupied. If winding 6 of relay $R^G$ were constantly supplied with alternating current of a single relative polarity as in Fig. 2, this relay would be energized by train controlling current supplied to the rails by transformer $S^G$. In order to prevent this, I control the relative polarity of the current supplied to winding 6 of relay $R^G$ over pole-changing contacts 54 and 58 on relay $Q^F$. Under normal conditions, when section D—G is unoccupied, current flows from terminal $x$ over front contact 54 of relay $Q^F$, wire 55, winding 6 of relay $R^G$, wires 56 and 57, front contact 58 of relay $Q^F$ to terminal $y$. Under these conditions the polarity of the current in winding 6 is such that relay $R^G$ is energized by track circuit current supplied to winding 5 by transformer $T^D$. When a train enters section D—G, thereby de-energizing relays $Q^E$, $Q^F$, and $R^G$, current flows from terminal $x$ over back contact 54 of relay $Q^F$, wires 57 and 56, winding 6 of relay $R^G$, wire 55, and back contact 58 of relay $Q^F$ to terminal $y$. Under these conditions, the relative instantaneous direction of the current in winding 6 is reversed with respect to the direction of the current supplied to the winding when relay $Q^F$ is closed. The de-energization of relay $R^G$ closes back contact 60, whereupon current flows from terminal $x$ over back contact 54 of relay $Q^F$, wires 57 and 59, back contact 60 of relay $R^G$, wires 61 and 62, motor 31 of coding device $K^G$, wires 125, 66, and 55, and back contact 58 of relay $Q^F$, to terminal $y$. The motor 31 is therefore operated and if relay $P^G$ is energized a circuit is closed each time contact 35—35$^b$ closes, over which current flows from terminal $x$, through back contact 54 of relay $Q^F$, wires 57 and 59, back contact 60 of relay $R^G$, wires 61, 63 and 64, contact 35—35$^b$, wire 44, front contact 45 of relay $P^G$, wires 51 and 65, primary 11 of transformer $S^G$, wires 66$^a$, 66 and 55, and back contact 58 of relay Q to terminal $y$. When this circuit is closed, train controlling current is supplied to the rails of section D—G from transformer $S^G$, and the polarity of this current is such that it flows through windings 3 of relays $Q^E$ and $Q^F$ in the opposite direction from the direction in which track circuit current from transformer $T^D$ flows through these windings. Since winding 10 is connected in parallel with winding 5 of relay $R^G$, however, the train controlling current flows through winding 5 in the same direction as the track circuit current from transformer $T^D$, but due to the pole-changing caused by contacts 54 and 58, the relative direction of the current in winding 6 of this relay is now reversed so that relay $R^G$ remains in its de-energized condition. When the train passes point F, relay $Q^F$ becomes energized as explained in connection with Fig. 2 and the pole-changing contacts 54 and 58 thereupon reverse the polarity of the current supplied to primary 11 of transformer $S^G$. At the same time, however, the polarity of the current supplied to winding 6 of relay $R^G$ is also reversed so that this relay remains in its de-energized position. It will be observed that winding 53 of transformer $M^G$ is shunted by front contact 37 of relay $R^G$ when this relay is energized. The winding 53 is also shunted each time the contact 34 or 35 of coding device $K^G$ which is in circuit with primary 11 of transformer $S^G$ is closed, in the same manner as primary 11 of transformer $S^G$ is shunted in Fig. 2. When the train passes out of the section, assuming relay $P^G$ to be closed, during the next interval that contact 35—35ᵃ is closed, current from transformer $T^D$ flows through winding 5 of relay $R^G$, and due to the small impedance of winding 52 of transformer $M^G$ which results from the short circuit placed upon winding 53 of this transformer, sufficient current is supplied to winding 5 to energize relay $R^G$. In all other respects the operation of the apparatus illustrated in Fig. 3 is similar to that described in connection with Fig. 2.

Figure 4:
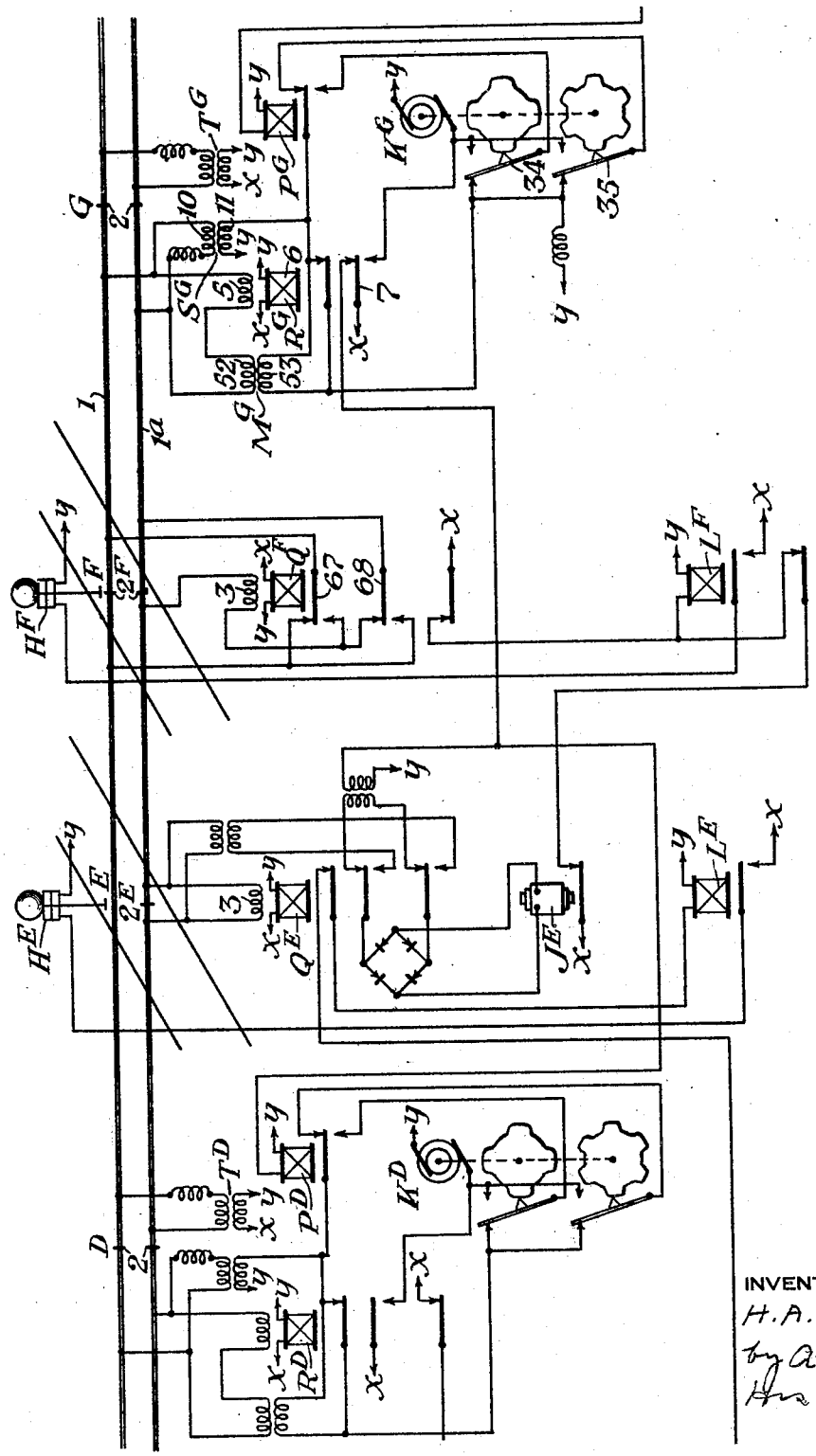

In the modification illustrated in Fig. 4, the train controlling current is supplied to the trackway by secondary 10 of transformer $S^G$ connected in parallel with winding 5 of relay $R^G$ and winding 52 of transformer $M^G$. The circuits for transformers $M^G$ and $S^G$ are similar to the circuits for similar parts in Fig. 3 except that the circuit for $S^G$ in Fig. 4 does not include pole-changing contacts on relay $Q^F$, but the polarity of the current supplied by transformer $S^G$ is such that the current supplied to winding 5 holds the relay open. The current then supplied to the rails of the section is of such polarity as to flow through the relays $Q^E$ and $Q^F$ in the same direction as track circuit current supplied by relay $T^D$. It will be observed, however, that in this modification, the section D—G is divided into a forward sub-section F—G and a rear sub-section D—F. Rail 1 of sub-section D—F is connected through winding 3 of relay $Q^F$, with rail 1ᵃ or 1 of sub-section F—G according as relay $Q^F$ is closed or open, and rail 1ᵃ of sub-section D—F is connected directly with rail 1ᵃ or 1 of sub-section F—G according as relay $Q^F$ is closed or open. It will be plain, therefore that the contacts 67 and 68 of relay $Q^F$ constitute a pole-changer for reversing the polarity of the train controlling current supplied to the rails in rear of point F. Due to the insertion of winding 3 of relay $Q^F$ in the connections between the rails of the sub-sections D—F and F—G, the direction of the current through this winding when train controlling current is being supplied to the section and a train is located in the sub-section D—F, is such that relay $Q^F$ is held open. With this arrangement relay $Q^F$ is normally energized by track circuit current but when a train enters the section D—G, this relay becomes de-energized, thereby reversing the connections between the rails of sub-sections D—F and F—G. At the same time, train controlling current is supplied to the transformer $S^G$ as will be apparent from the drawing. With relay $Q^F$ down this train controlling current flows through winding 3 of relay $Q^F$ in such direction as to hold the relay open. Furthermore, the relative polarity of the current now supplied to winding 3 of relay $Q^E$ from transformer $S^G$ is such that relay $Q^E$ is also held in its de-energized position. When the train passes point E, relay $Q^E$ becomes energized by track circuit current supplied by transformer $T^D$ as explained hereinafter and when the train passes point F, the track circuit current flowing from transformer $T^D$ reverses the direction of the current in winding 3 of relay $Q^F$ and picks up this relay. After relay $Q^F$ has closed, the direction of the current in winding 3 is still such as to hold the relay closed. The control of the highway crossing signals by the relays $Q^E$ and $Q^F$ is the same as has already been described in connection with Fig. 2.

Figure 5:
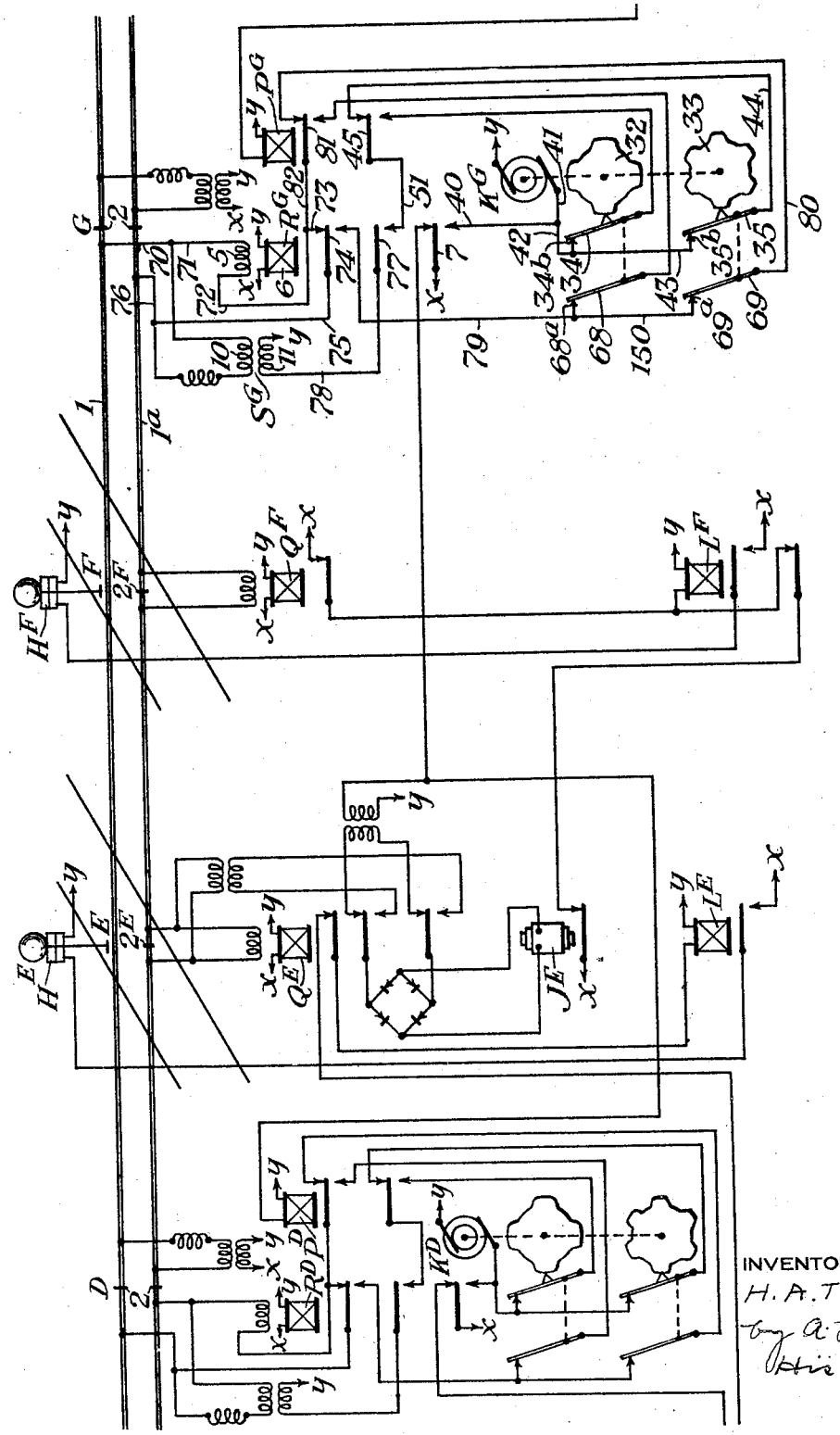
Figure 6:
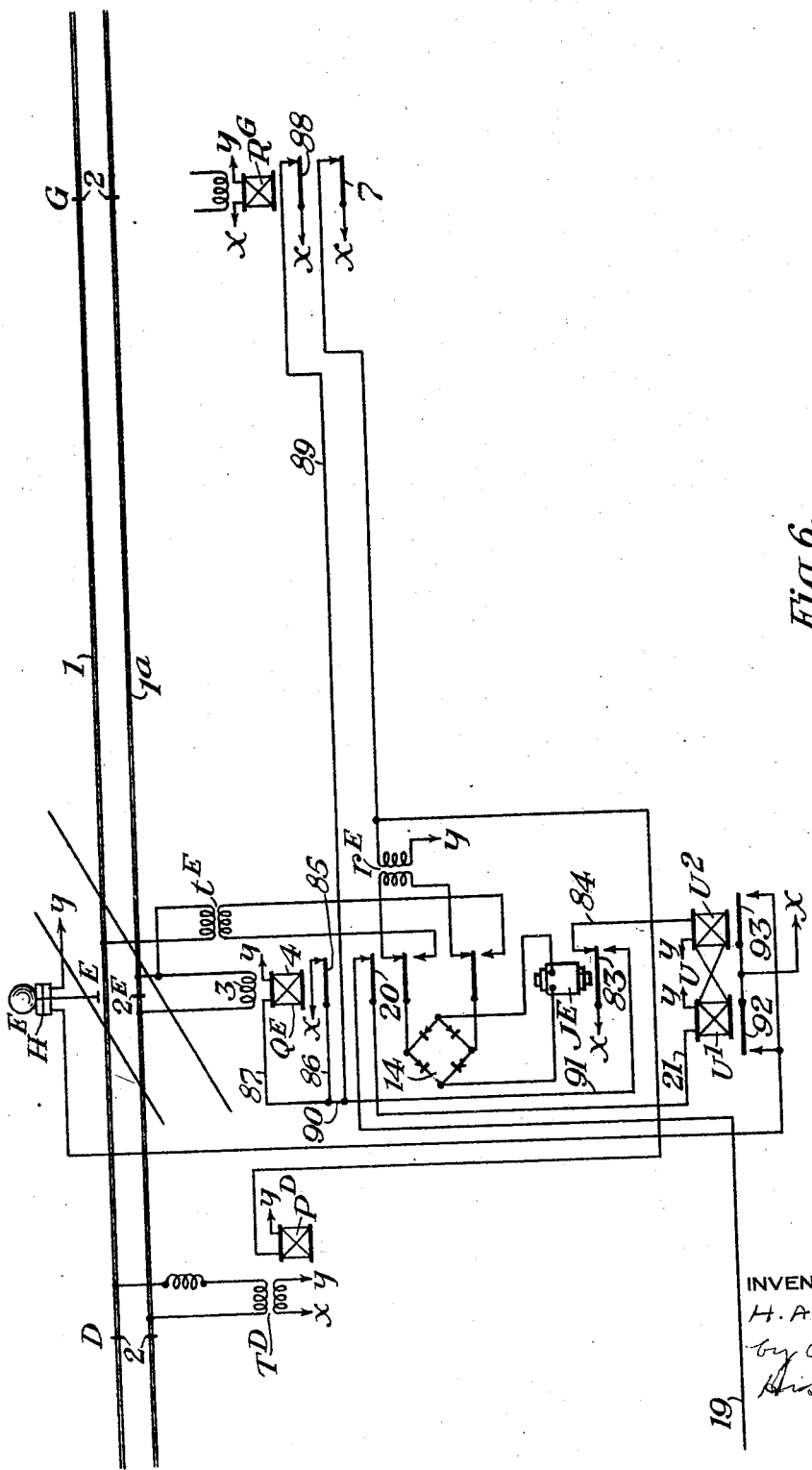

In the modification shown in Fig. 5, winding 5 of relay $R^G$ is normally connected with the rails over its own front contact 74, the circuit for this winding passing from rail 1, through wires 70 and 71, winding 5 of relay $R^G$, wires 72 and 73, front contact 74 of relay $R^G$ and wires 75 and 76 back to rail 1ᵃ. The secondary of the train control transformer $S^G$ is connected directly across the rails so that when the circuit just traced is closed, winding 5 is connected in parallel with secondary 10 of transformer $S^G$. The train controlling current supplied by transformer $S^G$ is of such polarity as to hold relays $Q^E$ and $Q^F$ closed. It will be apparent that if winding 5 of relay $R^G$ is connected with the rails when train controlling current is being supplied to the trackway the relay will be energized by such train controlling current. When a train enters the section D—G, however, de-energizing relay $R^G$, the circuit just traced for winding 5 is opened, thereby disconnecting the winding from the rails. The de-energization of relay $R^G$ also sets the coding device $K^G$ into operation. In the form here shown, this coding device is provided with a contact 68—68ᵃ operated by code wheel 32 and arranged to be closed when contact 34—34ᵇ is open. In similar manner code wheel 33 operates a contact 69—69ᵃ arranged to be closed when contact 35—35ᵇ is open. Assuming that relay $P^G$ is energized, train controlling current is supplied to the primary of transformer $S^G$ each time contact 35—35$^b$ is closed over a circuit which passes from terminal $x$, through back contact 7 of relay $R^G$, wires 40, 42 and 43, contact 35—35$^b$, wire 44, front contact 45 of relay $P^G$, wire 51, back contact 77 of relay $R^G$, wire 78, and primary 11 of transformer $S^G$ to terminal $y$. The current thus supplied to the trackway from the train control transformer $S^G$ flows through the rails in such direction as to hold relays $Q^E$ and $Q^F$ in their de-energized positions, and this current does not energize relay $R^G$ because winding 5 is disconnected from the track rails. During the interval between successive impulses of train controlling current the winding 5 of relay $R^G$ is connected with the rails over a circuit which may be traced from rail 1, through wires 70 and 71, winding 5 of relay $R^G$, wires 72 and 82, front contact 81 of relay $P^G$, wire 80, contact 69—69$^a$, wires 150 and 79, back contact 74 of relay $R^G$ and wires 75 and 76, to rail 1$^a$. After a train passes out of section D—G, therefore, the relay $R^G$ becomes energized during the next succeeding interval between impulses of train controlling current, thereby de-energizing the coding device $K^G$ and restoring the apparatus to its normal position in which the winding 5 of relay $R^G$ is connected across the track rails through its own front contact 74. The operation of the highway crossing signals in Fig. 5 will be readily understood from the explanation of the preceding figures.

Under some conditions of operation, it may be desirable to operate a highway crossing signal, such for example, as signal $H^E$, to protect train movements in either direction. This may be accomplished with the apparatus shown in Fig. 6. In the modification here shown, the relay $R^G$ may be controlled in accordance with any of the schemes illustrated in Figs. 2, 3, 4 or 5 so that this relay is de-energized when the section is occupied by a train moving in either direction and is energized when the section is unoccupied. The relay $R^G$ controls apparatus for supplying train controlling current to the track rails in the same manner as in the preceding views. Associated with relay $J^E$ is an interlocking relay U comprising two windings $U^1$ and $U^2$. When either of the back contacts 92 or 93 of relay U is closed, current is supplied to the signal $H^E$ to operate this signal. The circuit for winding $U^1$ of relay U is similar to the circuit for relay $L^E$ in Figs. 2-5, inclusive, and passes from terminal $x$ on Fig. 1, through front contact 18 of relay $J^C$, wire 19, front contact 20 of relay $Q^E$, wire 21, and winding $U^1$ to terminal $y$. The circuit for winding $U^2$ passes from terminal $x$, over front contact 83 of relay $J^E$, wire 84, and winding $U^2$ to terminal $y$.

Winding 4 of relay $Q^E$ is normally supplied with energy from terminal $x$, over front contact 85 of relay $Q^E$, wires 86 and 87, winding 4 of relay $Q^E$ to terminal $y$. This winding is provided with two other circuits, one of which passes from terminal $x$, over front contact 88 of relay $R^G$, wires 89, 90 and 87, winding 4 of relay $Q^E$ to terminal $y$, and the other of which passes from terminal $x$, over back contact 83 of relay $J^E$, wires 91, 90 and 87, and winding 4 of relay $Q^E$ to terminal $y$. It should be observed that the primary of transformer $t^E$ is connected across the rails 1 and 1$^a$ of section D—G on the right-hand side of the insulated joint $2^E$. With the apparatus shown in this view when a train passes point C in Fig. 1, the de-energization of relay $J^C$ opens the circuit for winding $U^1$ of the interlocking relay U. The closing of back contact 92 therefore sets the crossing signal $H^E$ into operation. When the train proceeds into section D—G, relay $R^G$ becomes energized, thereby opening front contact 88. Relay $Q^E$ also becomes de-energized, thereby connecting relay $J^E$ with transformer $t^E$. This transformer now receives energy from the train controlling current supplied to the exit end of the section under the control of relay $R^G$. Relay $J^E$ is therefore energized and back contact 83 of relay $J^E$ is open. It will be plain therefore that all of the circuits for winding 4 of relay $Q^E$ are open and winding 4 is therefore deprived of energy. When the train passes point E, the shunting effect of the train discontinues the supply of the train controlling energy to transformer $t^E$, and relay $J^E$ therefore opens. Winding $U^2$ of the interlocking relay U is now de-energized, but due to the interlocking features of the relay, back contact 93 does not close. Back contact 92 of relay U remains closed, however, and the signal $H^E$ continues to operate. When the rear of the train passes point E, train controlling current flows through winding 3 of relay $Q^E$. Since relay $J^E$ is now de-energized, current is supplied to the winding 4 of relay $Q^E$ over back contact 83 of relay $J^E$ and relay $Q^E$ picks up. Relay $J^C$ became energized when the train passed out of section A—D and the energization of relay $Q^E$ therefore completes the circuit for winding $U^1$ of relay U, but back contact 93 of relay U remains open. The operating circuit for signal $H^E$ is therefore opened and the operation of the signal is discontinued. When the train passed out of the section D—G the energization of relay $R^G$ restores the apparatus to its normal condition.

I will assume that a train moving from right to left enters the section D—G, thereby de-energizing relay $R^G$. The opening of front contact 7 on this relay breaks the circuit for transformer $r^E$ and since relay $Q^E$ is energized by track circuit current from transformer $T^D$, relay $J^E$ becomes de-energized. Winding $U^2$ of relay U is therefore de-energized and back contact 93 closes to set signal H$^E$ into operation. When the front of the train passes point E, relay Q$^E$ drops, and the circuit for winding U$^1$ of relay U is then opened, but contact 92 of this relay does not close. When the rear of the train passes point E, relay J$^E$ becomes energized due to current supplied thereto from transformer T$^D$ which is energized by train controlling current supplied from the right-hand end of section D—G. Relay J$^E$ therefore closes its front contact 83 to energize winding U$^2$ and back contact 93 of this relay therefore opens. Since contact 92 is now locked open, the operation of signal H$^E$ is discontinued. With the arrangement of apparatus shown in Fig. 6, it will be apparent that a train moving in either direction will set signal H$^E$ into operation as the train approaches the signal and will discontinue the operation of the signal after the rear of the train has passed point E.

In some of the modifications hereinbefore disclosed the train controlling current supplied to the rails forces the relays Q$^E$, Q$^F$ and R$^G$ into their de-energized positions. With some types of relay, this operation may be undesirable and with the circuits shown in Fig. 7 instead of reversing the direction of operation of the relay, I disconnect the supply of energy to one winding of the relays Q$^E$, Q$^F$ or R$^G$ when train controlling current is being supplied to the trackway, so that it is impossible for such train controlling current to energize these relays.

Figure 7:
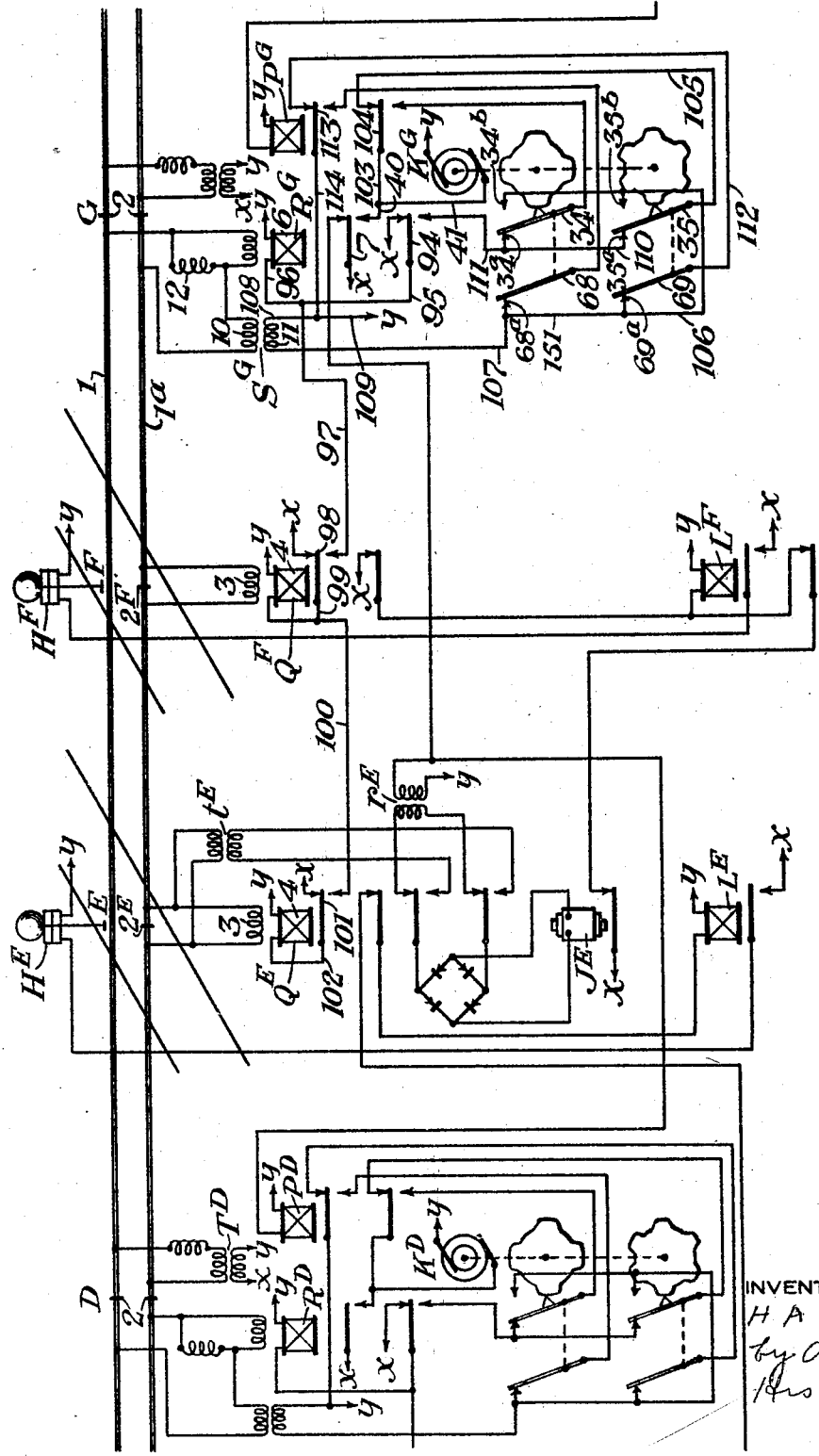

Referring to Fig. 7, winding 4 of relay Q$^E$ is normally supplied with current over its own front contact 101, and in similar manner winding 4 of relay Q$^F$ is normally supplied with current over its own front contact 98 and winding 6 of relay R$^G$ is normally supplied with current over its own front contact 94. When a train enters section D—G, however, relays Q$^E$, Q$^F$ and R$^G$ becomes de-energized and the circuits just traced for supplying windings 4 of relays Q$^E$ and Q$^F$ and winding 6 of relay R$^G$ become open. The closing of back contact 7 of relay R$^G$ sets the coding device K$^G$ into operation, and assuming that relay P$^G$ is energized, train controlling current is supplied to primary 11 of transformer S$^G$ each time contact 35—35$^b$ is closed over a circuit which passes from terminal x, through back contact 7 of relay R$^G$, wires 40 and 103, front contact 104 of relay P$^G$, wire 105, contact 35—35$^b$, wires 106, 151 and 107, primary 11 of transformer S$^G$ and wires 108 and 109, to terminal y. The secondary of transformer S$^G$ is connected in series with winding 5 of relay R$^G$ in the same manner as in Fig. 2. The train controlling current thus supplied to the trackway cannot energize relays Q$^E$, Q$^F$ or R$^G$ because each of these relays has its winding 4 open-circuited. When contact 35—35$^a$ of coding device K$^G$ is closed, current flows from terminal x, through back contact 7 of relay R$^G$, wires 40 and 103, front contact 104 of relay P$^G$, wire 105, contact 35—35$^a$, wires 110 and 111, back contact 94 of relay R$^G$, wires 95 and 96, winding 6 of relay R$^G$ to terminal y. During the interval between successive impulses of train controlling current, winding 6 is therefore energized so that if under these conditions, track circuit current is supplied to winding 5, relay R$^G$ will become energized. The closing of contact 35—35$^a$ also supplies current to winding 4 of relay Q$^F$ over a branch for the circuit just traced which passes from wire 95, through wire 97, back contact 98 of relay Q$^F$, wire 99, winding 4 of relay Q$^F$ to terminal y. Another branch passes from wire 99, through wire 100, back contact 101 of relay Q$^E$, wire 102, and winding 4 of relay Q$^E$ to terminal y. It will be plain, therefore that while the supply of current to one winding of each of the relays Q$^E$, Q$^F$ and R$^G$ is interrupted during the impulse of train controlling current, these windings are supplied with energy during the intervals between such impulses so that during these intervals the relays can be energized by track circuit current. It should also be observed that during the interval between successive impulses of train controlling current supplied to the trackway, a circuit of low resistance is closed for primary 11 of transformer S$^G$ which may be traced from the left-hand terminal of this primary through wires 107 and 151, contact 69—69$^a$ of coding device K$^G$, wire 112, front contact 113 of relay D$^G$ and wires 114 and 108, back to the right-hand terminal of this primary. The consequent reduction in the impedance of secondary 10 of transformer S$^G$ during the intervals between successive impulses of train controlling current facilitates the energization of relay R$^G$ by track circuit current from transformer T$^D$.

Figure 8:
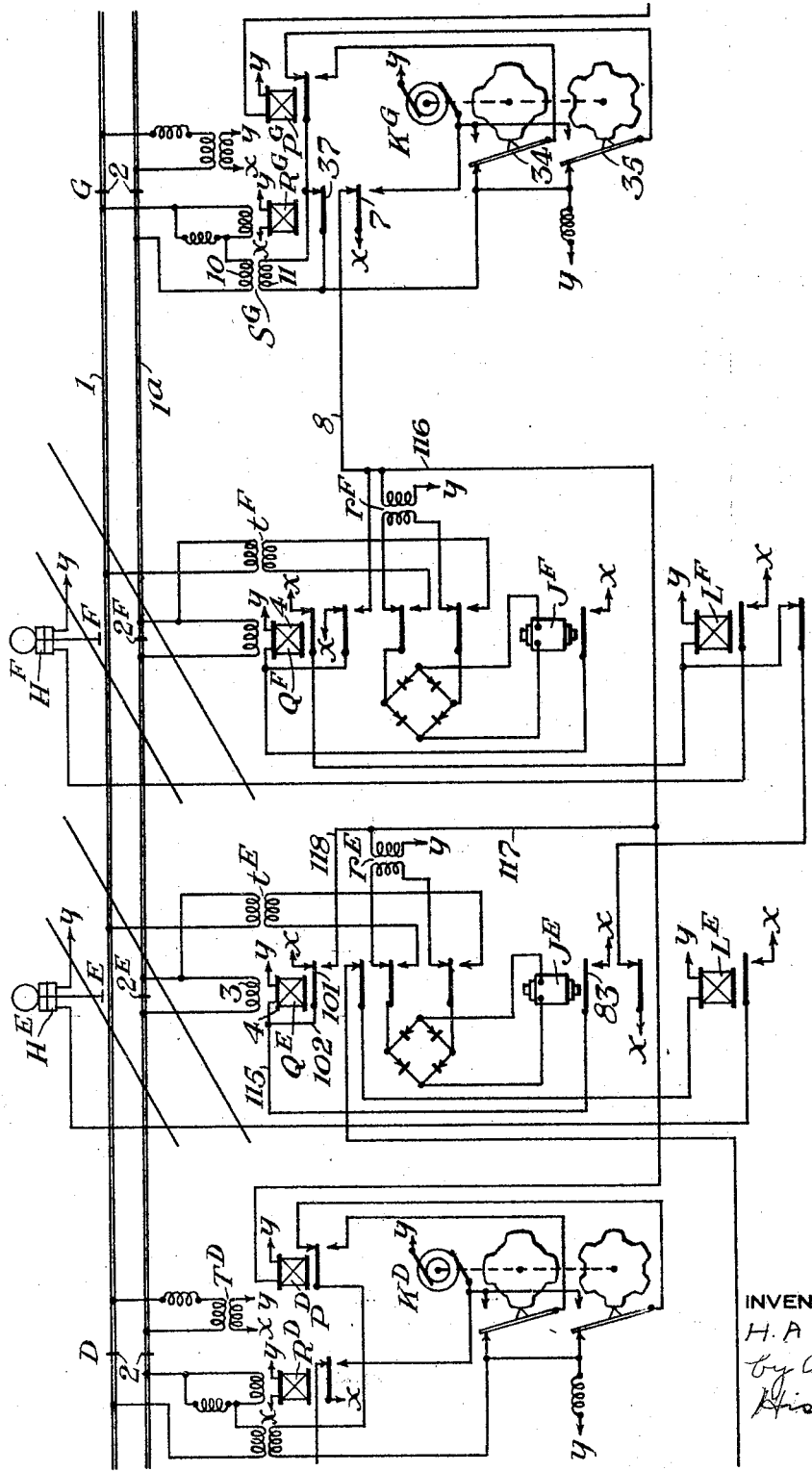

Returning now to the apparatus illustrated in Fig. 2, it might happen with the apparatus herein disclosed that a light engine travelling at a high speed could pass point E without energizing relay Q$^E$, due to the fact that the primary of transformer t$^E$ is connected in parallel with winding 3 of relay Q$^E$ and the secondary of transformer t$^E$ is connected with the relay J$^E$ over back contacts of relay Q$^E$ so that the primary of transformer t$^E$ operates as a shunt of low resistance in parallel with winding 3 of relay Q$^E$. This undesirable possibility is removed with the apparatus arranged as shown in Fig. 8 in which the primary of transformer t$^E$ is connected across rails 1 and 1$^a$ of the section D—G on the right of the insulated joint 2$^E$. With this arrangement when the train passes the joint 2$^E$, relay J$^E$ becomes de-energized as before, but when the transformer is connected in this manner there is no tendency to shunt the winding 3 of relay $J^E$. Fig. 8 also differs from Fig. 2 in that current is normally supplied to winding 4 of relay $Q^E$ over front contact 101 of the relay. When the relay becomes de-energized, this circuit is of course opened but when relay $J^E$ drops, current is supplied to winding 4 over back contact 83 of relay $J^E$. When the train passes point E, de-energizing relay $J^E$, current is restored to winding 4 of relay $J^E$ so that after the rear of the train clears the joint $2^E$, the relay $Q^E$ may become energized by track circuit current from transformer $T^D$. If a train enters section D—G thereby de-energizing relay $Q^E$, and then backs out of the section without de-energizing relay $J^E$, both of the circuits already traced for winding 4 of relay $Q^E$ will be open. As soon as this train backs out of the section, relay $R^G$ will pick up as explained in connection with Fig. 2 and a circuit will be closed from terminal $x$, over front contact 7 of relay $R^G$, wires 8, 116, 117 and 118, back contact 101 of relay $Q^E$, wire 102, winding 4 of relay $Q^E$ to terminal $y$. When this circuit is closed, track circuit current from transformer $T^D$ flowing through winding 3 picks up relay $Q^E$. A slow-acting relay $J^F$ similar to relay $J^E$ is associated with relay $Q^F$ for supplying current to winding 4 of relay $Q^F$ when a train passes joint $2^F$.

Figure 9:
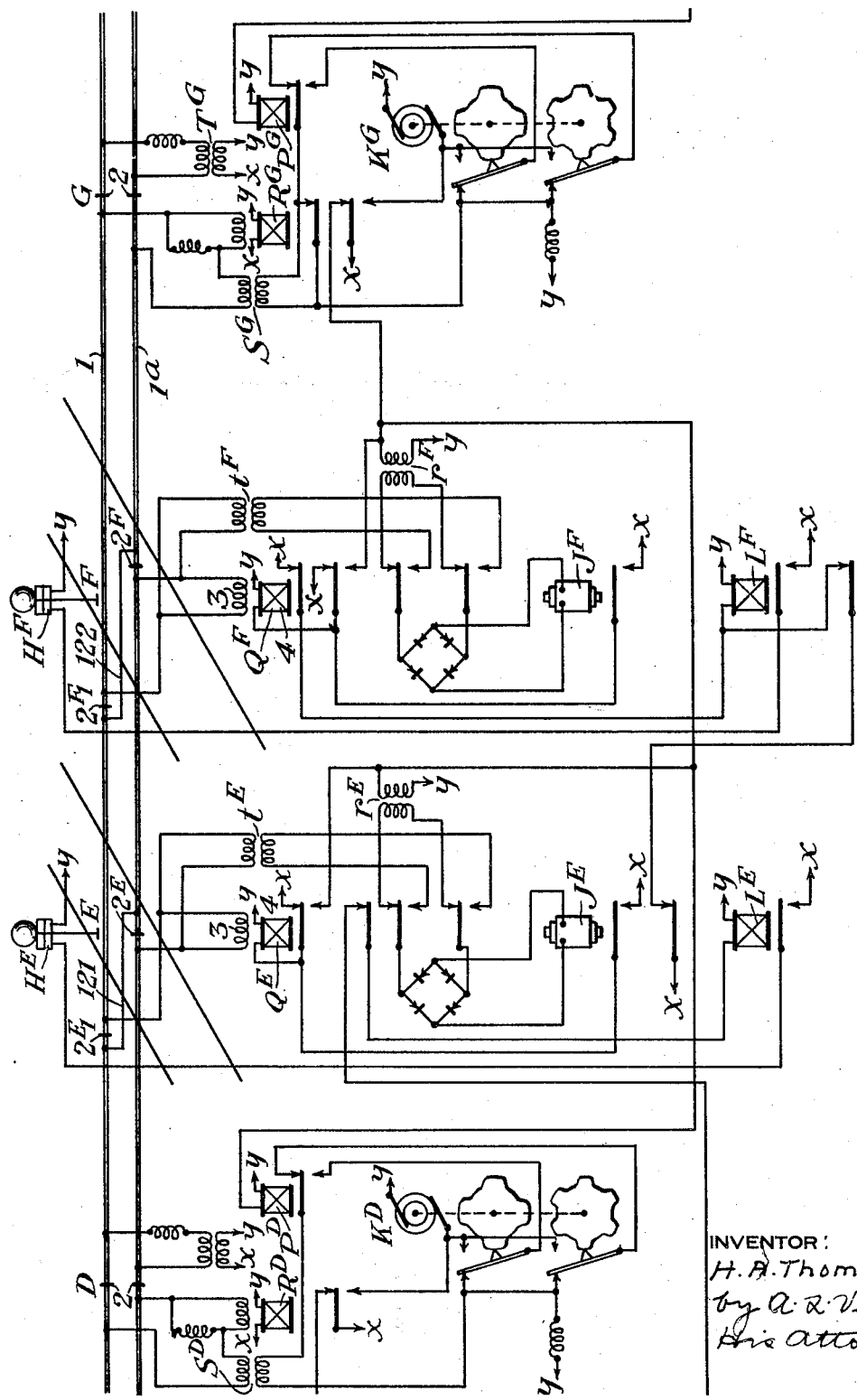

The apparatus illustrated in Fig. 9 is similar to that shown in Fig. 8, but the primary of each of the transformers $t$ is connected directly across the winding 3 of the associated relay Q. A pair of staggered insulated joints $2^E$ and $2^E{}_1$ are located adjacent point E, and winding 3 of relay $Q^E$ is connected across the rails between these joints. A conductor 121 connects rail 1 with rail $1^a$ outside of the insulated joints $2^E$ and $2^E{}_1$. In similar manner, two insulated joints $2^F$ and $2^F{}_1$ are located in the rails 1 and $1^a$, respectively adjacent point F and the rails outside of these joints are connected together by a conductor 122. Winding 3 of relay $Q^F$ is connected across the rails between the joints $2^F$ and $2^F{}_1$. With this arrangement relay $Q^E$ will be shunted until the train has cleared joint $2^E$ and current will be shunted away from transformer $t^E$ to open relay $J^E$ as soon as the train passes joint $2^E{}_1$. The purpose of this arrangement is to insure that the relay $J^E$ becomes de-energized before the train shunt is removed from relay $Q^E$, thereby insuring that relay $Q^E$ will be properly picked up. In similar manner, relay $Q^F$ is shunted until the train has passed joint $2^F$ but relay $J^F$ is shunted as soon as the train passes joint $2^F{}_1$.

Although I have herein shown and described only a few forms of railway traffic controlling apparatus embodying my invention, it is understood that various changes and modifications may be made therein within the scope of the appended claims without departing from the spirit and scope of my invention.

Having thus described my invention, what I claim is:

1. In combination, a section of railway track, a highway crossing said section, a source of energy connected across the rails adjacent the entrance end of the section, an insulated joint in one rail adjacent said highway crossing, a winding connected across said joint, and a highway crossing signal located adjacent said crossing and controlled by said winding.

2. In combination, a section of railway track, a source of energy connected across the rails adjacent one end of the section, two insulated joints in one rail located at spaced points intermediate the ends of such section, two windings one connected across each said joint, and a trackway signal controlled by said windings.

3. In combination, a section of railway track, an insulated joint in one rail, a winding connected across said joint, means for normally supplying the track rails in series with current of one relative polarity, means for at times supplying the rails in series with current of the other relative polarity, and a trackway signal controlled by said winding in accordance with the relative polarity of the current supplied thereto.

4. In combination, a section of railway track, means for supplying track circuit current to the rails adjacent the entrance end of the section, means effective when the section is occupied by a train to supply train controlling current to the rails adjacent the exit end of the section, an insulated joint in one rail of the section, a relay connected across said joint and arranged to be energized by such track circuit current but not by such train controlling current, and a signal controlled by said relay.

5. In combination, a section of railway track, means for supplying track circuit current to the rails adjacent the entrance end of the section, means effective when the section is occupied by a train to supply train controlling current to the rails adjacent the exit end of the section, an insulated joint in one rail of the section, a relay connected across said joint and arranged to be energized by such track circuit current but not by such train controlling current, a second relay, means controlled by the first relay for at times supplying the second relay with energy in parallel with the first relay, and a signal controlled by the second relay.

6. In combination, a section of railway track, means for supplying track circuit current to the rails adjacent the entrance end of the section, means effective when the section is occupied by a train to supply train controlling current to the rails adjacent the exit end of the section, a first relay connected across the rails adjacent the exit end of the section and arranged to be energized by track circuit current but not by train controlling current, an insulated joint in one rail of the section, a second relay connected across said joint and arranged to be energized by track circuit current but not by train controlling current, a first transformer supplied with energy when the first relay is energized, a second transformer supplied with energy in parallel with said second relay, and a third relay connected with the first or the second transformer according as the second relay is energized or de-energized.

7. In combination, a section of railway track, means for constantly supplying current of one relative polarity to the rails adjacent one end of the section, means effective when the section is occupied by a train to supply current of the opposite relative polarity to the rails adjacent the other end of the section, an insulated joint in one rail of the section, a relay comprising a first winding constantly supplied with current and a second winding connected across said joint in such manner that the relay is energized by current of such one relative polarity but not by current of the other relative polarity, and a signal controlled by said relay.

8. In combination, a section of railway track, means for constantly supplying current of one relative polarity to the rails adjacent one end of the section, a track relay having one winding connected across the rails adjacent the other end of the section, means effective when said track relay is de-energized to supply current of the opposite relative polarity to the rails in parallel with said one winding whereby such one winding is supplied with current of said one relative polarity, an insulated joint in one rail of the section, a second relay having a winding connected across said joint and responsive to the relative polarity of the current supplied thereto, a second winding on said track relay, and means for supplying said second winding with current of one relative polarity or the other according as said second relay is energized or de-energized.

9. In combination, a section of railway track, means for constantly supplying current to the rails adjacent one end of the section, an insulated joint in one rail of the section, a relay having one winding connected across said joint and a second winding supplied with current, and a signal controlled by said relay.

10. In combination, a section of railway track, means for constantly supplying current of one relative polarity to the rails adjacent one end of the section, means for at times supplying current of the other relative polarity to the rails adjacent the other end of the section, an insulated joint in one rail of the section, a relay having one winding connected across said joint and a second winding constantly supplied with current of a single relative polarity whereby the relay will be effectively energized by one of said track rail currents but not by the other, and a signal controlled by said relay.

11. In combination, a section of railway track, means for at times supplying periodically varied alternating current to the rails adjacent one end of the section, an insulated joint in one rail of the section, a transformer having a primary connected across said joint, a slow acting relay, means including a rectifier for supplying energy from the secondary of said transformer to said relay, and a signal controlled by said relay.

12. In combination, a section of railway track, an insulated joint in one rail of the section, a winding connected across said joint, means for supplying alternating current to the rails adjacent one end of the section, and means controlled by said winding for at times periodically varying said current.

In testimony whereof I affix my signature.

HOWARD A. THOMPSON.